United States Patent
Aiki et al.

(10) Patent No.: US 11,327,317 B2
(45) Date of Patent: May 10, 2022

(54) INFORMATION PROCESSING APPARATUS AND INFORMATION PROCESSING METHOD

(71) Applicant: SONY CORPORATION, Tokyo (JP)

(72) Inventors: Kazuma Aiki, Tokyo (JP); Ryo Fukazawa, Kanagawa (JP); Jun Kimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/963,642

(22) PCT Filed: Dec. 28, 2018

(86) PCT No.: PCT/JP2018/048407
§ 371 (c)(1),
(2) Date: Jul. 21, 2020

(87) PCT Pub. No.: WO2019/150880
PCT Pub. Date: Aug. 8, 2019

(65) Prior Publication Data
US 2021/0063746 A1 Mar. 4, 2021

(30) Foreign Application Priority Data
Jan. 30, 2018 (JP) .............................. JP2018-013670

(51) Int. Cl.
*G02B 27/01* (2006.01)
*H04N 13/344* (2018.01)
*G06T 19/00* (2011.01)

(52) U.S. Cl.
CPC ........ *G02B 27/0172* (2013.01); *G06T 19/006* (2013.01); *H04N 13/344* (2018.05);
(Continued)

(58) Field of Classification Search
CPC ...... G02B 2027/0134; G02B 2027/014; G02B 2027/0178; G02B 27/017; G02B 27/0172;
(Continued)

(56) References Cited

U.S. PATENT DOCUMENTS

| | | | |
|---|---|---|---|
| 2004/0208357 A1 | 10/2004 | Tokuhashi et al. | |
| 2011/0012993 A1* | 1/2011 | Kuno | H04N 21/4884 348/43 |

(Continued)

FOREIGN PATENT DOCUMENTS

| | | |
|---|---|---|
| CN | 102292998 A | 12/2011 |
| CN | 103118265 A | 5/2013 |

(Continued)

OTHER PUBLICATIONS

International Search Report and Written Opinion of PCT Application No. PCT/JP2018/048407, dated Mar. 26, 2019, 11 pages of ISRWO.

(Continued)

*Primary Examiner* — Dmitriy Bolotin
(74) *Attorney, Agent, or Firm* — Chip Law Group

(57) ABSTRACT

[Problem] To provide an information processing apparatus, an information processing method, and a program. [Solution] An information processing apparatus including a display control unit that causes a display unit to display a virtual image in a three-dimensional space. The display control unit causes the display unit to display only one of a left-eye image and a right-eye image corresponding to the virtual image if it is determined that the virtual image is located outside of a predetermined range in a depth direction when viewed from a user of the display unit, and causes the display unit to display the left-eye image and the right-eye image if it is determined that the virtual image is located inside of the predetermined range.

16 Claims, 9 Drawing Sheets

(52) U.S. Cl.
CPC ............. *G02B 2027/0134* (2013.01); *G02B 2027/0178* (2013.01)

(58) Field of Classification Search
CPC ... G06T 19/006; H04N 13/128; H04N 13/344
See application file for complete search history.

(56) References Cited

U.S. PATENT DOCUMENTS

| | | | |
|---|---|---|---|
| 2011/0221750 A1* | 9/2011 | Sato | H04N 13/315 345/419 |
| 2011/0248904 A1* | 10/2011 | Miyawaki | H04N 13/344 345/7 |
| 2012/0092457 A1* | 4/2012 | Sugino | H04N 13/286 348/46 |
| 2013/0003026 A1* | 1/2013 | Rothaar | G03B 21/2033 353/85 |
| 2013/0120362 A1* | 5/2013 | Harris | H04N 13/363 345/419 |
| 2013/0215106 A1* | 8/2013 | Yamaguchi | G06F 3/038 345/419 |
| 2016/0131911 A1* | 5/2016 | Border | G06F 3/0317 345/8 |
| 2017/0039772 A1* | 2/2017 | Mukawa | G02B 27/0172 |
| 2018/0120573 A1* | 5/2018 | Ninan | G06F 3/013 |
| 2019/0205851 A1* | 7/2019 | Sinha | G06Q 20/32 |

FOREIGN PATENT DOCUMENTS

| | | |
|---|---|---|
| CN | 108549487 A | 9/2018 |
| EP | 2365701 A1 | 9/2011 |
| EP | 2595397 A2 | 5/2013 |
| JP | 08-179275 A | 7/1996 |
| JP | 2003-018619 A | 1/2003 |
| JP | 2003-241100 A | 8/2003 |
| JP | 2012-019376 A | 1/2012 |
| JP | 2012-109934 A | 6/2012 |
| JP | 2013-106355 A | 5/2013 |
| JP | 2014-010418 A | 1/2014 |
| KR | 10-2013-0054181 A | 5/2013 |
| WO | 2010/061689 A1 | 6/2010 |
| WO | 2017/022303 A1 | 2/2017 |

OTHER PUBLICATIONS

Office Action for CN Patent Application No. 201880087591.7, dated Aug. 18, 2021, 11 pages of Office Action and 11 pages of English Translation.

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/048407 filed on Dec. 28, 2018, which claims priority benefit of Japanese Patent Application No. JP 2018-013670 filed in the Japan Patent Office on Jan. 30, 2018. Each of the above-referenced applications is hereby incorporated herein by reference in its entirety.

FIELD

The present disclosure relates to an information processing apparatus, an information processing method, and a program.

BACKGROUND

In recent years, a display device that displays an image that can be viewed in a stereoscopic manner (hereinafter, referred to as a stereoscopic image or a virtual image) in a three-dimensional space has been used. For example, there is a known technology in which a left-eye image and a right-eye image are displayed such that the images are deviated in a horizontal direction to give binocular disparity to a user, so that a stereoscopic image is viewed as if the stereoscopic image is located in a three-dimensional space. However, stereoscopic vision using the display device as described above may impose a burden on the user.

In contrast, a technology for reducing a burden on a user in stereoscopic vision has also been proposed. For example, Patent Literature 1 described below proposes a technology for reducing, in a display device that is worn on a user and displays a left-eye image and a right-eye image, a burden on a user that may occur depending on magnitude of a convergence angle with respect to a display object (stereoscopic image) that is perceived by the user.

CITATION LIST

Patent Literature

Patent Literature 1: International Publication No. WO/2017/022303

SUMMARY

Technical Problem

However, a factor that imposes a burden on the user in stereoscopic vision is not limited to just the magnitude of the convergence angle with respect to the stereoscopic image. For example, in a display device that displays a stereoscopic image, a difference may occur between a distance to an image of display light focused by eyeballs of the user (adjustment distance) and a distance from the user to a display position at which the stereoscopic image is displayed (convergence distance). In a case in which the difference is increased, a burden may be imposed on the user.

As described above, in the technology for displaying a stereoscopic image, there is a demand to reduce a burden on a user.

Solution to Problem

According to the present disclosure, an information processing apparatus is provided that includes:

a display control unit that causes a display unit to display a virtual image in a three-dimensional space, wherein the display control unit causes the display unit to display only one of a left-eye image and a right-eye image corresponding to the virtual image if it is determined that the virtual image is located outside of a predetermined range in a depth direction when viewed from a user of the display unit, and causes the display unit to display the left-eye image and the right-eye image if it is determined that the virtual image is located inside of the predetermined range.

Moreover, according to the present disclosure, an information processing method is provided that includes:

causing, by a processor, a display unit to display a virtual image in a three-dimensional space;

causing the display unit to display only one of a left-eye image and a right-eye image corresponding to the virtual image if it is determined that the virtual image is located outside of a predetermined range in a depth direction when viewed from a user of the display unit; and causing the display unit to display the left-eye image and the right-eye image if it is determined that the virtual image is located inside of the predetermined range.

Moreover, according to the present disclosure, a program is provided that causes a computer to execute functions of:

causing a display unit to display a virtual image in a three-dimensional space;

causing the display unit to display only one of a left-eye image and a right-eye image corresponding to the virtual image if it is determined that the virtual image is located outside of a predetermined range in a depth direction when viewed from a user of the display unit; and causing the display unit to display the left-eye image and the right-eye image if it is determined that the virtual image is located inside of the predetermined range.

Advantageous Effects of Invention

As described above, according to the present disclosure, it is possible to reduce a burden on a user in stereoscopic vision.

Further, the effects described above are not limitative. That is, with or in the place of the above effects, any of the effects described in this specification or other effects that can be recognized from this specification may be achieved.

DESCRIPTION OF EMBODIMENTS

Figure 1:
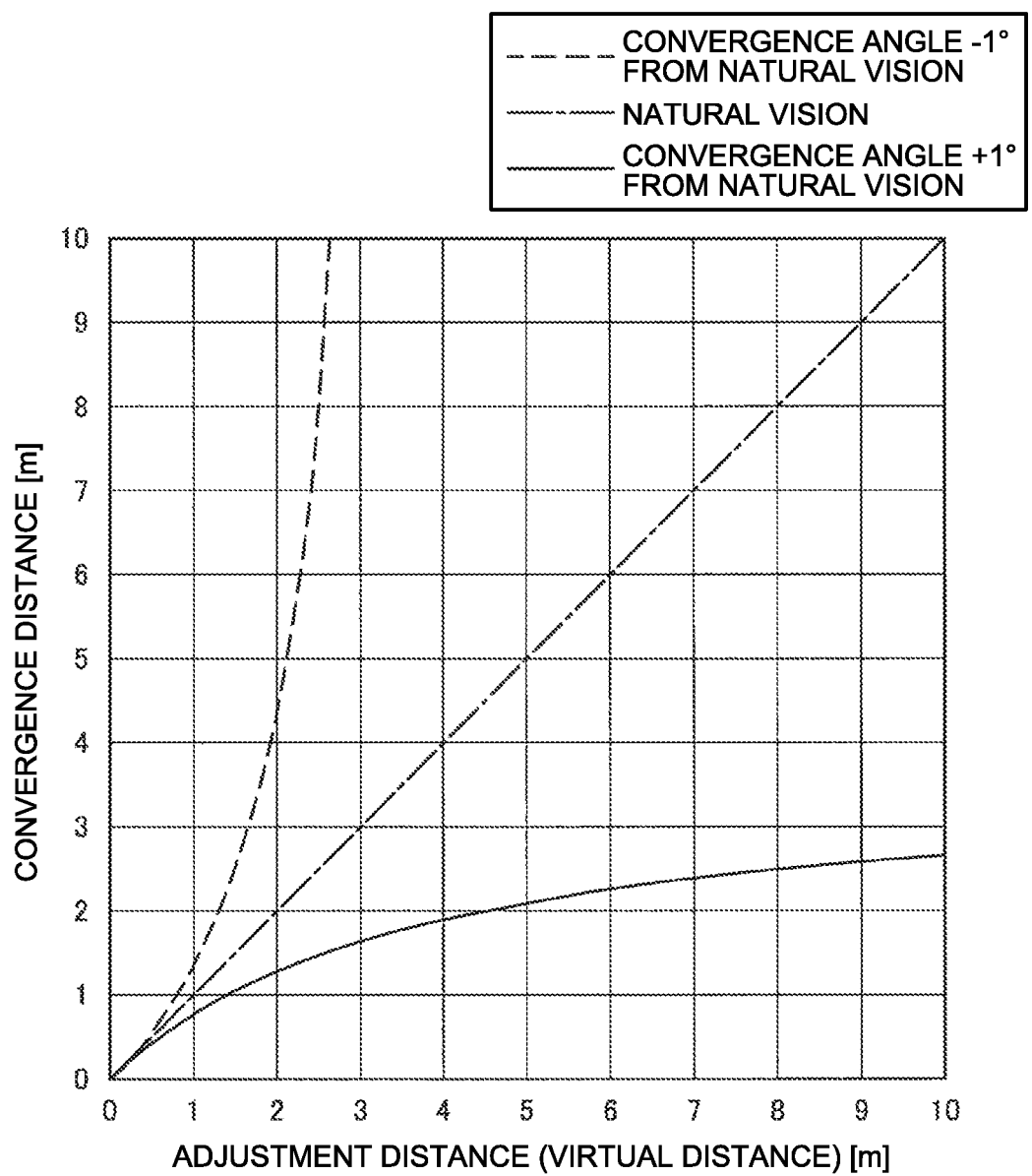
FIG. 1 is a diagram illustrating a relationship between an adjustment distance and a convergence distance in a range of an amount of difference recommended in ISO 9241-392.

Preferred embodiments of the present disclosure will be described in detail below with reference to the accompanying drawings. In this specification and the drawings, structural elements that have substantially the same functions and configurations will be denoted by the same reference symbols, and repeated explanation of the structural elements will be omitted.

Furthermore, in this specification and the drawings, a plurality of structural elements that have substantially the same functions and configurations may be distinguished from one another by appending different alphabets after the same reference symbols. However, if the structural elements that have substantially the same functions and configurations need not be specifically distinguished from one another, the structural elements will be denoted by only the same reference symbols.

In addition, hereinafter, explanation will be given in the following order.
<<1. Introduction>>
<1-1. Background>
<1-2. Overview of present technology>
<<2. First Embodiment>>
<2-1. Configuration>
<2-2. Operation>
<<3. Second Embodiment>>
<3-1. Configuration>
<3-2. Operation>
<<4. Modification>>
<4-1. First modification>
<4-2. Second modification>
<4-3. Third modification>
<<5. Hardware configuration example>>
<<6. Conclusion>>

1. INTRODUCTION

1-1. Background

For explanation of embodiments of the present disclosure, a background that has led to creation of the embodiments of the present disclosure will be first described.

In recent years, a display device that displays a stereoscopic image (virtual object or the like) such that the image is viewed as if the image is superimposed in a three-dimensional space (hereinafter, may be simply referred to as superimposed) has been developed. For example, with use of a display device that is called a head-mounted display (hereinafter, referred to as an HMD) and that is worn on a head of a user, it is possible to display a left-eye image and a right-eye image such that the images are deviated in a horizontal direction to thereby display a stereoscopic image in a three-dimensional space.

Meanwhile, in the present specification, the stereoscopic image means an image that is displayed in a three-dimensional space and allows a user to feel binocular disparity. Therefore, the stereoscopic image is not limited to an image having a three-dimensional shape, but even a stereoscopic image having a two-dimensional shape may be adopted if the stereoscopic image allows a user to feel binocular disparity by being displayed in the three-dimensional space and viewed by the user as if the stereoscopic image is present at a display position at the time of display. Contents of the stereoscopic image are not specifically limited, and may include, for example, a character, an effect, a text, a button, or the like. Further, the three-dimensional space in which the display device superimposes the stereoscopic image may be a real space or a virtual space. In the following, an example in which a stereoscopic image is displayed in a real space will be mainly described.

When the stereoscopic image is displayed in the real space, a display unit that displays a left-eye image and a right-eye image in the HMD includes, for example, a lens and a compact display panel with optical transmissivity. In this configuration, a virtual image distance (may also be referred to as an adjustment distance) that is a distance from a user (more precisely, from eyeballs of the user) to an image of display light focused (adjusted) by the eyeballs of the user depends on a positional relationship between the lens and the compact display panel. Therefore, if the positional relationship is fixed, the virtual image distance at which the virtual image is focused is fixed. Meanwhile, it may be possible to include a mechanism for driving a lens in the display unit to make it possible to change the virtual image distance; however, this may lead to a complicated device configuration or an increase in a device size, and therefore, in the following, an example will be described in which a display unit with a fixed virtual image distance is adopted. As described above, the virtual image distance and the adjustment distance are substantially correspond to each other; however, in the following, the "virtual image distance" may be mainly used in the context of explanation on the display device for the sake of convenience, and the "adjustment distance" may be mainly used in the context of explanation of natural vision for the sake of convenience.

In contrast, a depth feeling given to the user is influenced by a distance (hereinafter, referred to as a convergence distance) from the user (more precisely, from the eyeballs of the user) to the display position of the stereoscopic image, and a convergence angle that is an angle determined by an interval between a left eye and a right eye (hereinafter, referred to as an interpupillary distance). If it is assumed that the convergence distance is denoted by D, the interpupillary distance is denoted by I, and the convergence angle is denoted by α, a relationship represented by Expression (1) is established.

$$\operatorname{Tan}(\alpha/2)=I/(2*D) \qquad (1)$$

In Expression (1), the interpupillary distance I varies between individuals but can be assumed as fixed for each user, and therefore, the convergence angle α of a certain user is determined by the convergence distance D. Then, the eyeballs of the user move in accordance with the convergence angle α determined by the convergence distance D.

Meanwhile, in the case of natural vision for observing a real object present in the real space, the eyeballs of the user adjust a focus in accordance with a distance from the user to the real object. Further, in the case of natural vision, the eyeballs of the user adopt a distance from the user to the real object as the convergence distance and rotate in accordance with a corresponding convergence angle. In other words, in the case of natural vision, the adjustment distance and the convergence distance match with each other.

However, in an existing display device, while the virtual image distance is fixed as described above, a stereoscopic image is displayed such that the convergence angle is changed in order to give a depth feeling to a user. As a result, unlike the case of natural vision as described above, the adjustment distance of the user and the virtual image distance of the display device substantially match with each other. In contrast, a difference occurs between the adjustment distance and the convergence distance, and the difference may become a cause of a burden, such as an uncomfortable feeling or a discomfort feeling, on the user. In addition, as a result, a symptom, such as motion sickness, may occur.

Further, eyeball movement of the user varies between individuals, and therefore, some users may have difficulty in fusing and observing images due to a difference between the adjustment distance and the convergence distance. The user as described above may also have difficulty in fusing images of a real object present at a close range, and therefore, a tendency to have difficulty in fusing images may increase if the adjustment distance and the convergence distance are different from each other.

With regard to the difference, in ISO 9241-392, it is recommended that an amount of difference between a convergence angle that is obtained when the convergence distance and the adjustment distance match with each other and a convergence angle that corresponds to an actual convergence distance is set to be ±1 degree or smaller. FIG. 1 is a diagram illustrating a relationship between the adjustment distance and the convergence distance in a range of the amount of difference recommend in ISO 9241-392.

In FIG. 1, in the case of natural vision indicated by a chain line, the adjustment distance represented by a horizontal axis and the convergence distance represented by a vertical axis match with each other. In the case of natural vision, the convergence angle is equivalent to a convergence angle that is obtained when the convergence distance and the adjustment distance match with each other as described above. Meanwhile, if the user focuses on the stereoscopic image, the convergence angle in the case of natural vision in FIG. 1 can be assumed as being substantially equal to the convergence angle corresponding to the virtual image distance.

In contrast, a range in which the convergence angle that corresponds to the convergence distance becomes at least 1 degree larger than the convergence angle that is obtained in natural vision is a region below a curved line represented by a solid line in FIG. 1. Further, a range in which the convergence angle that corresponds to the convergence distance becomes at least 1 degree smaller than the convergence angle that is obtained in natural vision is a region above a curved line represented by a dashed line in FIG. 1. In other words, the recommended range described in ISO 9241-392 corresponds to a range between the solid line and the dashed line in FIG. 1.

A change of the convergence angle increases with a decrease in a distance at which display is performed; therefore, as illustrated in FIG. 1, the recommended range is reduced with a decrease in the convergence distance or the adjustment distance. In some applications provided in an HMD as described above, it is often the case that a distance (convergence distance) to a display position of a stereoscopic image may be a short distance of 2 meters (m) or smaller, and in this case, a burden, such as an uncomfortable feeling or a discomfort feeling, may be imposed on a user.

For example, in an HMD capable of superimposing a stereoscopic image in a real space, a use case may be adopted in which the stereoscopic image is displayed on a hand of the user as a display position. In this case, a length of the hand of the user varies between individuals or depending on a posture or the like, but it is possible to assume that the convergence distance that is a distance from the user to the display position of the stereoscopic image approximately falls within a range of 30 centimeters (cm) to 70 cm. The convergence angle corresponding to this convergence distance falls within a range of 7 degrees.

In contrast, as described above, the amount of difference recommended by ISO 9241-392 is ±1 degree, that is, the recommended range is a range of 2 degrees. Therefore, if a display unit of an HMD is designed to have a fixed virtual image distance by taking into account the use case as described above, there is no virtual image distance by which all of expected convergence distances fall within the recommended range. Therefore, in the use case as described above, as long as the virtual image distance of the display unit is fixed, the display unit may be used while exceeding the recommended range described in ISO 9241-392, so that a burden, such as an uncomfortable feeling or a discomfort feeling, is likely to be imposed on the user.

1-2. Overview of Present Technology

To cope with this, the embodiments of the present disclosure are made by focusing on the above-described circumstances. An information processing apparatus according to the embodiments of the present disclosure, when it is determined that a stereoscopic image is located outside of a predetermined range of the stereoscopic image, is able to display only one of a right-eye image and a left-eye image of the stereoscopic image, to thereby reduce a burden on the user. In the following, an overview of a technology of the embodiments of the present disclosure (hereinafter, also referred to as a present technology) will be described with reference to FIG. 2 and FIG. 3. Hereinafter, for the sake of convenience, the adjustment distance and the virtual image distance are uniformly described as the "adjustment distance".

Figure 2:
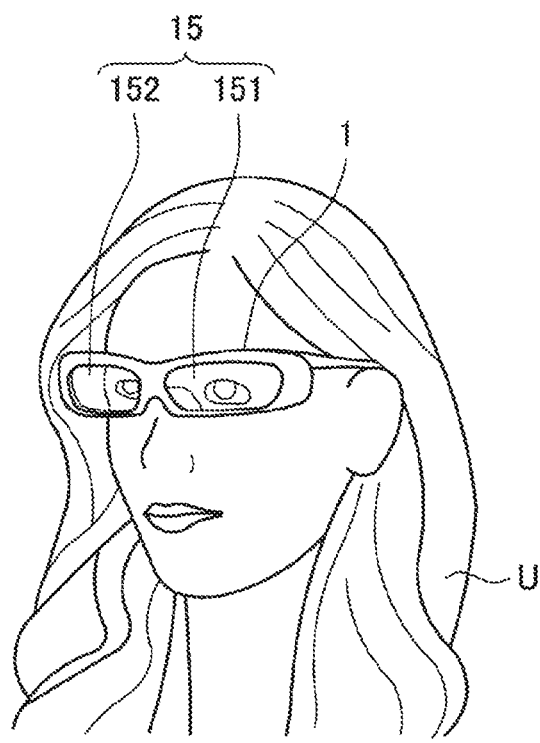
FIG. 2 is a diagram illustrating an example of an exterior of an information processing apparatus common to all of embodiments of the present disclosure.

FIG. 2 is a diagram illustrating an example of an exterior of an information processing apparatus common to all of the embodiments of the present disclosure. As illustrated in FIG. 2, an information processing apparatus 1 according to each of the embodiments of the present disclosure is realized by a glasses-type HMD that is worn on a head of a user U, for example. A display unit 15 that corresponds to a glasses-lens part located in front of eyes of the user U when the apparatus is worn has optical transmissivity.

Further, as illustrated in FIG. 2, the display unit 15 includes a left-eye display 151 that displays a left-eye image corresponding to the stereoscopic image, and a right-eye display 152 that displays a right-eye image corresponding to the stereoscopic image. When the information processing apparatus 1 is worn on the user U, as illustrated in FIG. 2, the left-eye display is located in front of a left eye of the user U and the right-eye display is located in front of a right eye of the user U. However, the present technology is not limited to this example, but it may be possible to display the left-eye image on a left side of an integrated display, and display a right-eye image on a right side of the same display. The information processing apparatus 1 is able to present a stereoscopic image in front of a line of sight of the user U by displaying the left-eye image and the right-eye image on the display unit 15.

Meanwhile, a shape of the information processing apparatus 1 is not limited to the example as illustrated in FIG. 2. For example, the information processing apparatus 1 may be an HMD of a headband type (a type that is worn by a band extended around the entire circumference of the head or a type in which a band is arranged so as to be extended along not only the side of the head, but also the top of the head), or an HMD of a helmet type (a visor part of a helmet serves as a display).

Figure 3:
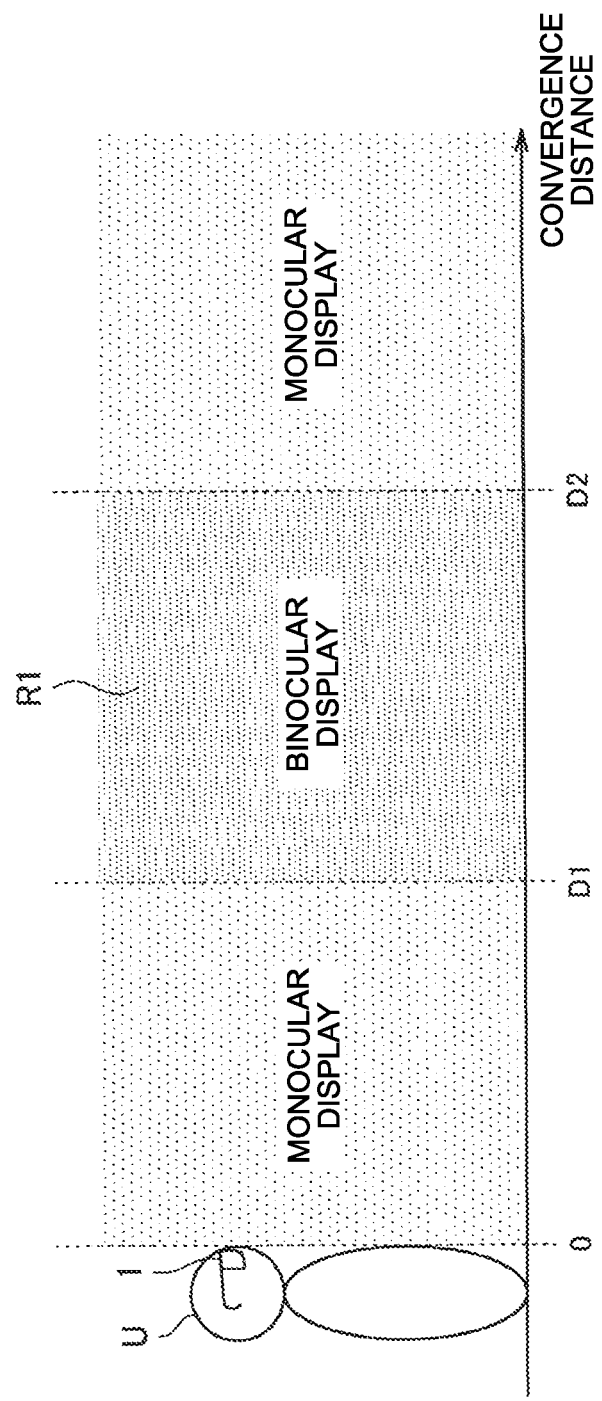
FIG. 3 is an explanatory diagram illustrating an overview of display of a stereoscopic image according to the present technology.

FIG. 3 is an explanatory diagram illustrating an overview of display of a stereoscopic image according to the present technology. A horizontal axis illustrated in FIG. 3 represents a convergence distance to a stereoscopic image displayed by the information processing apparatus 1 in a depth direction when viewed by the user U who is wearing the information processing apparatus 1 according to the embodiments of the present disclosure.

As illustrated in FIG. 3, the information processing apparatus 1 common to all of the embodiments of the present disclosure displays an image in any of display formats such as monocular display and binocular display in accordance with the convergence distance. Meanwhile, in the present disclosure, the binocular display indicates a display format in which both of the left-eye image and the right-eye image are displayed on the display unit 15, and the monocular display indicates a display format in which one of the left-eye image and the right-eye image is displayed on the display unit 15. Meanwhile, binocular non-display to be described later indicates a display format in which both of the left-eye image and the right-eye image are not displayed on the display unit 15.

If the binocular display is adopted as the display format of an image, it is possible to give binocular disparity to a user, and the user is able to stereoscopically perform observations. In contrast, if the monocular display is adopted as the display format of an image, binocular disparity is not given to the user, but it is possible to reduce a burden, such as an uncomfortable feeling and a discomfort feeling, on the user. Meanwhile, if a display position of the stereoscopic image is fixed in the three-dimensional space or fixed in a predetermined positional relationship with respect to an object in the three-dimensional space, it is possible to give a stereoscopic effect due to kinematic disparity to the user regardless of whether the binocular display or the monocular display is adopted as the display format of the image.

In the example illustrated in FIG. 3, the binocular display is adopted as the display format of the image when the convergence distance is equal to or larger than a first distance D1 and equal to or smaller than a second distance D2, and the monocular display is adopted as the display format of the image when the convergence distance is smaller than the first distance D1 or larger than the second distance D2. In other words, as illustrated in FIG. 3, if it is assumed that an inclusive range from the first distance D1 to the second distance D2 is referred to as a predetermined range R1, the binocular display is adopted as the display format of the information processing apparatus 1 when the stereoscopic image is located in the predetermined range R1 and the monocular display is adopted when the stereoscopic image is located outside of the predetermined range R1. Meanwhile, it may be possible to set a third distance smaller than the first distance D1, and adopt the binocular non-display when the convergence distance is equal to or larger than 0 and smaller than the third distance.

Here, the first distance D1 and the second distance D2 that define the predetermined range R1 may be set to have predetermined relationships with the adjustment distance that is fixed in the display unit 15. For example, a relationship of the first distance D1 with the adjustment distance that is fixed in the display unit 15 may be set such that the first distance D1 is a convergence distance corresponding to a convergence angle that is a predetermined angle larger than a convergence angle that is obtained in natural vision at the adjustment distance. Further, a relationship of the second distance D2 with the adjustment distance that is fixed in the display unit 15 may be set such that the second distance D2 is a convergence distance corresponding to a convergence angle that is a predetermined angle smaller than the convergence angle that is obtained in natural vision at the adjustment distance.

More preferably, the first distance D1 and the second distance D2 may be set such that the predetermined range R1 corresponds to the recommended range that is explained above with reference to FIG. 1. It is preferable that, for example, the first distance D1 is a convergence distance corresponding to a convergence angle that is 1 degree larger than the convergence angle that is obtained in natural vision as described above (hereinafter, also referred to as a convergence distance corresponding to the convergence angle+1 degree). Further, it is preferable that the second distance D2 is a convergence distance corresponding to a convergence angle that is 1 degree smaller than the convergence angle that is obtained in natural vision as described above (hereinafter, also referred to as a convergence distance corresponding to the convergence angle−1 degree). Table 1 described below is a table indicating a relationship of the adjustment distance, the convergence angle in the natural vision in which the adjustment distance and the convergence distance match with each other, and the convergence distance corresponding to the convergence angle±1 degree. Meanwhile, the convergence angle in Table 1 is preliminary calculated based on the assumption that a distance between left and right pupils is 63.5 millimeters (mm), and may increase or decrease depending on an interpupillary distance of each of users.

TABLE 1

Relationship among adjustment angle, convergence angle in natural vision, and convergence distance corresponding to convergence angle of ±1 degree

| Adjustment distance | 2 m | 3 m | 4 m | 5 m |
|---|---|---|---|---|
| Convergence angle in natural vision | 1.819° | 1.213° | 0.9096° | 0.7276° |
| Convergence distance corresponding to convergence angle +1° | 1.29 m | 1.64 m | 1.91 m | 2.11 m |
| Convergence angle corresponding to convergence angle −1° | 4.4 m | 17.1 m | infinity | infinity |

According to Table 1, for example, if the adjustment distance is set to 5 m, the convergence distance corresponding to the convergence angle+1 degree as a limit of a short distance in the recommended range in FIG. 1 is 2.11 m, and the convergence distance corresponding to the convergence angle−1 degree as a limit of a long distance is infinity. Further, if the adjustment distance is set to 2 m, the convergence distance corresponding to the convergence angle+1 degree as the limit of the short distance in the recommended range in FIG. 1 is 1.29 m, and the convergence distance corresponding to the convergence angle−1 degree as the limit of the long distance is 4.4 m.

By setting the convergence distance corresponding to the convergence angle+1 degree to the first distance D1 and setting the convergence distance corresponding to the convergence angle−1 degree to the second distance D2, the monocular display is adopted as the display format of the image in the case where the position is located outside of the recommended range in FIG. 1, so that it is possible to reduce a burden on the user. However, the present technology is not limited to this example, and, for example, it may be possible to set the first distance D1 to a distance smaller than the convergence distance corresponding to the convergence angle+1 degree, and set the second distance D2 to the convergence distance corresponding to the convergence angle−1 degree.

Thus, the overview of the technology according to the present disclosure has been described above. Next, each of the embodiments of the present disclosure will be described in detail.

2. FIRST EMBODIMENT

2-1. Configuration

First, a configuration of the information processing apparatus 1 according to a first embodiment of the present disclosure will be described in detail. In the following, the information processing apparatus 1 according to the first embodiment of the present disclosure will be referred to as an information processing apparatus 1-1.

Figure 4:
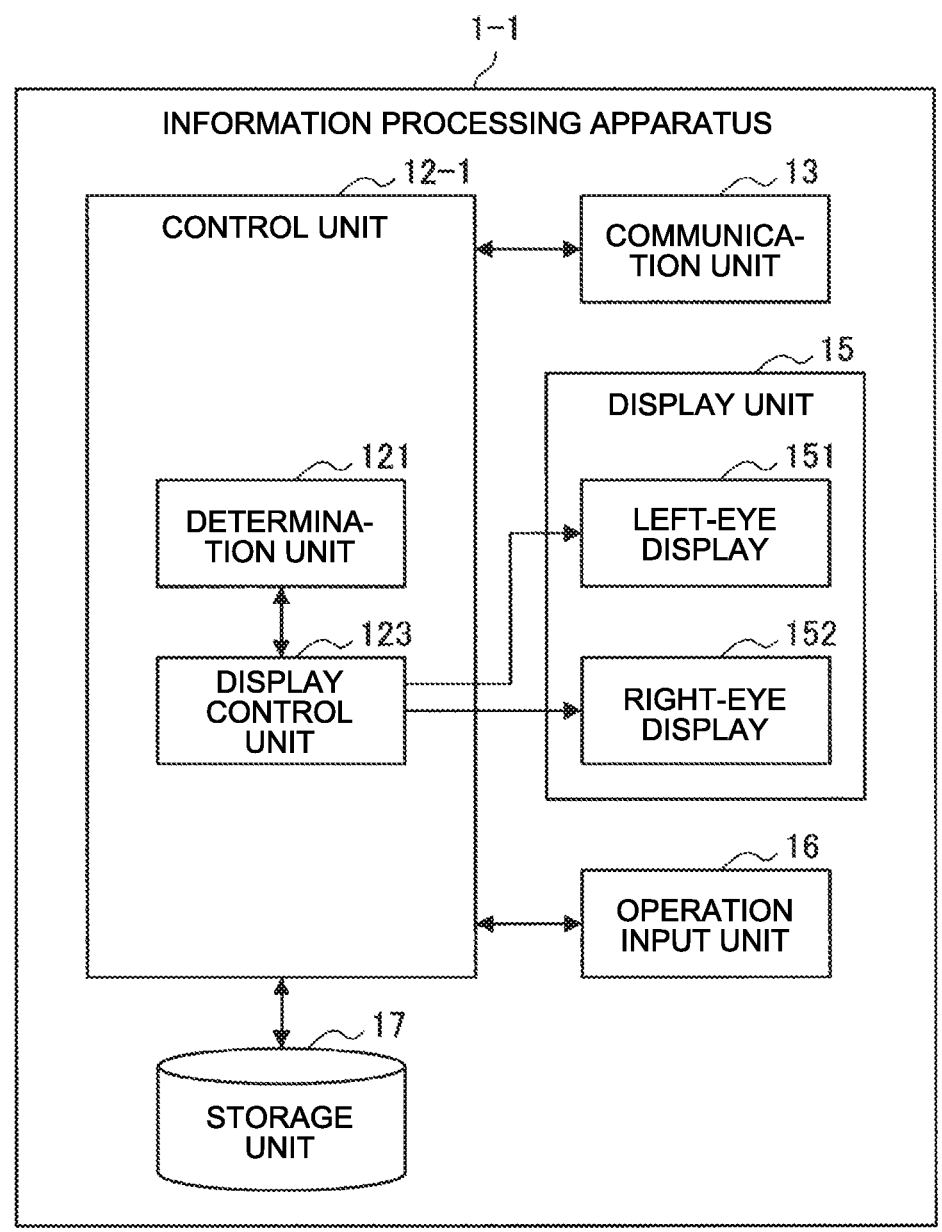
FIG. 4 is a block diagram illustrating a configuration of an information processing apparatus 1-1 according to a first embodiment of the present disclosure.

FIG. 4 is a block diagram illustrating a configuration of the information processing apparatus 1-1 according to the first embodiment of the present disclosure. As illustrated in FIG. 4, the information processing apparatus 1-1 according to the first embodiment includes a control unit 12-1, a communication unit 13, the display unit 15, an operation input unit 16, and a storage unit 17. In the following, an overall configuration of the information processing apparatus 1-1 is first explained, and thereafter, functions of the control unit 12-1 will be described in detail.

The control unit 12-1 functions as an arithmetic processing device and a control device, and controls entire operation in the information processing apparatus 1-1 in accordance with various programs. Further, as illustrated in FIG. 4, the control unit 12-1 according to the first embodiment functions as a determination unit 121 and a display control unit 123. Functions of the control unit 12-1 as the determination unit 121 and the display control unit 123 will be described later.

The communication unit 13 is a communication module for performing data transmission and reception with other devices in a wired or wireless manner. The communication unit 13 performs wireless communication using a system, such as a wired local area network (LAN), a wireless LAN, Wireless Fidelity (Wi-Fi, registered trademark), infrared communication, Bluetooth (registered trademark), or near field/contactless communication, with external apparatuses directly or via a network access point.

The display unit 15 is controlled by the display control unit 123 (to be described later), and displays a stereoscopic image in a real space (one example of a three-dimensional space). As described above with reference to FIG. 2, the display unit 15 has optical transmissivity, and with this configuration, it is possible to superimpose the stereoscopic image in the real space.

Further, the display unit 15 according to the present embodiment has the fixed adjustment distance (virtual image distance) as described above. Meanwhile, in the present specification, the display unit 15 having the fixed adjustment distance indicates that the adjustment distance is fixed in a state in which a positional relationship between the display unit 15 and both eyes of the user is fixed. Meanwhile, for example, if it is possible to change the adjustment distance by manual adjustment, when a configuration in which the adjustment distance is not automatically changed while the user is performing observation or the user is wearing the apparatus, it is assumed that the adjustment distance is fixed.

Furthermore, as illustrated in FIG. 4, the display unit 15 according to the first embodiment includes the left-eye display 151 and the right-eye display 152 that are described above with reference to FIG. 2. The left-eye display 151 and the right-eye display 152 may independently be controlled by the display control unit 123 to be described later.

For example, while the left-eye display 151 is displaying a left-eye image corresponding to a stereoscopic image, the right-eye display 152 may display nothing or may display an image irrelevant to the stereoscopic image or an alternative image (to be described later), for example. Furthermore, while the left-eye display 151 is displaying the left-eye image corresponding to the stereoscopic image, power supply to the right-eye display 152 may be reduced. Meanwhile, reduction of the power supply to the right-eye display 152 includes, for example, not only a case in which a power source of the right-eye display 152 is turned off and power supply to the right-eye display 152 is stopped, but also a case in which the right-eye display 152 enters a power saving mode in which power consumption is reduced. Meanwhile, it is a matter of course that the same control performed on the right-eye display 152 as described above is also performed on the left-eye display 151.

The operation input unit 16 is realized by an operation member, such as a switch, a button, or a lever, that has a physical structure.

The storage unit 17 stores therein a program or a parameter for causing the control unit 12-1 to execute each of functions. For example, the storage unit 17 may store therein a left-eye image and a right-eye image corresponding to a stereoscopic image displayed by the display control unit 123 (to be described later), a parameter related to the stereoscopic image, and the like. Furthermore, the storage unit 17 may store therein user information (to be described later).

Thus, the entire configuration of the information processing apparatus 1-1 has been described above. Next, the functions of the control unit 12-1 will be described in detail.

The determination unit 121 determines whether the stereoscopic image that is displayed in the real space by the display unit 15 is located outside of the predetermined range. For example, the determination unit 121 may use, for determination, the predetermined range R1 described above with reference to FIG. 3, and determine whether the stereoscopic image is located outside of the predetermined range R1. In other words, the predetermined range R1 that is used by the determination unit 121 for the determination may be an inclusive range from the first distance D1 to the second distance D2 from the user. As described above with reference to FIG. 3, the predetermined range R1 is a range based on the first distance D1 and the second distance D2 that have the predetermined relationships with the fixed adjustment distance of the display unit 15.

Meanwhile, here, it is preferable that the distance from the user is, for example, a distance from an intermediate position of the both eyes of the user, but strictness is not always required, and it may be possible to use a distance from a head position of the user as the distance from the user. Alternatively, because the information processing apparatus 1-1 is used by being worn on the user as described above with reference to FIG. 2, it may be possible to use a distance from the information processing apparatus 1-1 or the like as the distance from the user.

The determination unit 121 may determine whether the stereoscopic image is located outside of the predetermined range R1 by determining whether a display position of the stereoscopic image in the real space is located outside of the predetermined range R1. Meanwhile, a method of identifying the display position of the stereoscopic image depends on, for example, an application or the like provided by the information processing apparatus 1-1, and not specifically limited in the present embodiment. The display position of the stereoscopic image may be identified by the display control unit 123, a function (not illustrated) of the control unit 12-1, or the parameter stored in the storage unit 17.

Moreover, as described above, in some cases, the stereoscopic image itself has a three-dimensional shape and a difference in depth may occur in the stereoscopic image, for example. In this case, even if a position that is identified as the display position of the stereoscopic image is located inside of the predetermined range R1, a part of the stereoscopic image may be excluded from the predetermined range R1 and the part may impose a burden on the user. Therefore, if at least a part of the stereoscopic image is not included in the predetermined range R1, the determination unit 121 may determine that the stereoscopic image is located outside of the predetermined range R1.

Meanwhile, a method of the determination performed by the determination unit 121 as to whether the stereoscopic image is located outside of the predetermined range is not limited to the example as described above. For example, the determination unit 121 may determine whether the stereoscopic image is located outside of the predetermined range R1 by determining whether a position of the center of gravity of the stereoscopic image is located outside of the predetermined range R1. Alternatively, the determination unit 121 may determine whether the stereoscopic image is located outside of the predetermined range on the basis of a type of the stereoscopic image. For example, the determination unit 121 may determine that a stereoscopic image is located outside of the predetermined range R1 if the stereoscopic image is of a certain type for which it is determined in advance that the image is to be displayed at a close range due to a parameter or the like stored in the storage unit 17. Moreover, the determination unit 121 may determine that the stereoscopic image is located outside of the predetermined range if it is determined that the stereoscopic image is located at a closer range than the predetermined range.

The display control unit 123 causes the display unit 15 to display the stereoscopic image in the real space (one example of the three-dimensional space). Further, the display control unit 123 according to the first embodiment controls the display unit 15 on the basis of the determination performed by the determination unit 121 as described above. The display control unit 123 may be able to independently control the left-eye display 151 and the right-eye display 152 included in the display unit 15 as described above. The display control unit 123 is able to cause the display unit 15 to display the stereoscopic image in the real space by causing the left-eye display 151 to display a left-eye image corresponding to the stereoscopic image and causing the right-eye display 152 to display a right-eye image corresponding to the stereoscopic image.

The display control unit 123 according to the first embodiment displays the stereoscopic image by switching between the display formats in accordance with a determination result obtained by the determination unit 121. For example, if the determination unit 121 determines that the stereoscopic image is located inside of the predetermined range, the display control unit 123 displays the stereoscopic image using the binocular display. In other words, if the determination unit 121 determines that the stereoscopic image is located inside of the predetermined range, the display control unit 123 causes the left-eye display 151 to display the left-eye image corresponding to the stereoscopic image and causes the right-eye display 152 to display the right-eye image corresponding to the stereoscopic image. Further, if the determination unit 121 determines that the stereoscopic image is located outside of the predetermined range, the display control unit 123 displays the stereoscopic image using the monocular display. In other words, if the determination unit 121 determines that the stereoscopic image is located outside of the predetermined range, the display control unit 123 causes the display unit 15 to display only one of the left-eye image and the right-eye image corresponding to the stereoscopic image. With this configuration, when a stereoscopic image that may impose a burden on a user if the binocular display is adopted as the display format, the display format of the image is switched to the monocular display and a burden on the user is reduced.

Furthermore, the display control unit 123 according to the first embodiment determines the one image that is to be displayed by the display unit 15 if it is determined that the stereoscopic image is located outside of the predetermined range. The determination of the one image as described above may be performed by using various methods.

For example, the display control unit 123 may determine the one image that is to be displayed by the display unit 15, on the basis of user information that is set in advance. Here, the user information is information on the user who is wearing the information processing apparatus 1-1, and may be stored in the storage unit 17 as described above or may be input by the user via the operation input unit 16, for example. Further, the user information may include information indicating a dominant eye of the user, for example. Meanwhile, the dominant eye is an eye that is more frequently used by the user or an eye that is more preferably used by the user. The dominant eye may be determined by a well-known method. The well-known method is a method that is performed without using any device, but the display control unit 123 may cause the display unit 15 to display guide information for determining the dominant eye. Specifically, the display control unit 123 first causes the display unit 15 to display a message of, for example, "maintain a state in which a finger overlaps with a specific real object". This message may be provided by the user by voice. Thereafter, a shielding image that shields approximately the entire field of view of the left eye is displayed on the left-eye display 151, and subsequently, the shielding image on the left-eye display 151 is deleted and a shielding image that shields approximately the entire field of view of the right eye is displayed on the right-eye display 152. The user is able to determine the dominant eye of the user by viewing the shielding image for the left eye and the shielding image for the right eye. Meanwhile, the information on the dominant eye of the user may be stored in the storage unit 17 by the user by any of input means.

If it is determined that the stereoscopic image is located outside of the predetermined range, the display control unit 123 may cause the display unit 15 to display only one of the left-eye image and the right-eye image corresponding to the dominant eye. For example, the display control unit 123 may cause the display unit 15 to display only the left-eye image when the dominant eye of the user is the left eye, and cause the display unit 15 to display only the right-eye image when the dominant eye of the user is the right eye. With this configuration, even if the monocular display is adopted as the display format of the image, the user is able to view the stereoscopic image more comfortably.

Alternatively, the display control unit 123 may determine the one image that is to be displayed by the display unit 15, on the basis of the display position of the stereoscopic image in the field of view of the user. For example, the display control unit 123 may display only the left-eye image when the display position of the stereoscopic image is located on the left side with respect to a central direction of the field of view of the user, and display only the right-eye image when the display position is located on the right side with respect to the central direction of the field of view of the user. Meanwhile, here, the center of the field of view of the user may be determined in accordance with orientation of the information processing apparatus 1-1. Further, whether the display position of the stereoscopic image is located on the right side or the left side with respect to the central direction of the field of view of the user may also be determined based on the left-eye image and the right-eye image corresponding to the stereoscopic image.

Furthermore, the display control unit 123 according to the first embodiment may realize the monocular display by controlling power supply to the display unit 15. For example, if it is determined that the stereoscopic image is located outside of the predetermined range, the display control unit 123 may realize the monocular display by reducing power supply to one of the left-eye display 151 and the right-eye display 152. Meanwhile, as described above, reduction of the power supply includes not only stop of power supply, but also transition to the power saving mode in which power consumption is reduced. With this configuration, it is possible to reduce power consumption.

Alternatively, if it is determined that the stereoscopic image is located outside of the predetermined range, the display control unit 123 may realize the monocular display by causing the display unit 15 to display an alternative image in place of one of the left-eye image and the right-eye image that is not displayed by the display unit 15. It is preferable that the alternative image is an image with low visibility for the user. Further, the alternative image may be an image that is prepared in accordance with characteristics of the display unit 15, and may be, for example, a black image or a white image. In other words, it is satisfactory that the alternative image is an image with a smaller amount of information than the image that is not displayed. With this configuration, for example, even if it is difficult to control power supply to the left-eye display 151 and the right-eye display 152, it is possible to realize the monocular display.

2-2. Operation

Thus, the configuration example of the information processing apparatus 1-1 according to the first embodiment of the present disclosure has been described. Next, an example of operation performed by the information processing apparatus 1-1 according to the first embodiment will be described. In the following, an example of basic operation of the first embodiment will be first described with reference to FIG. 5, and thereafter, an example of operation of determining one image to be displayed by the display unit 15 on the basis of the display position of the stereoscopic image will be described with reference to FIG. 6.

Figure 5:
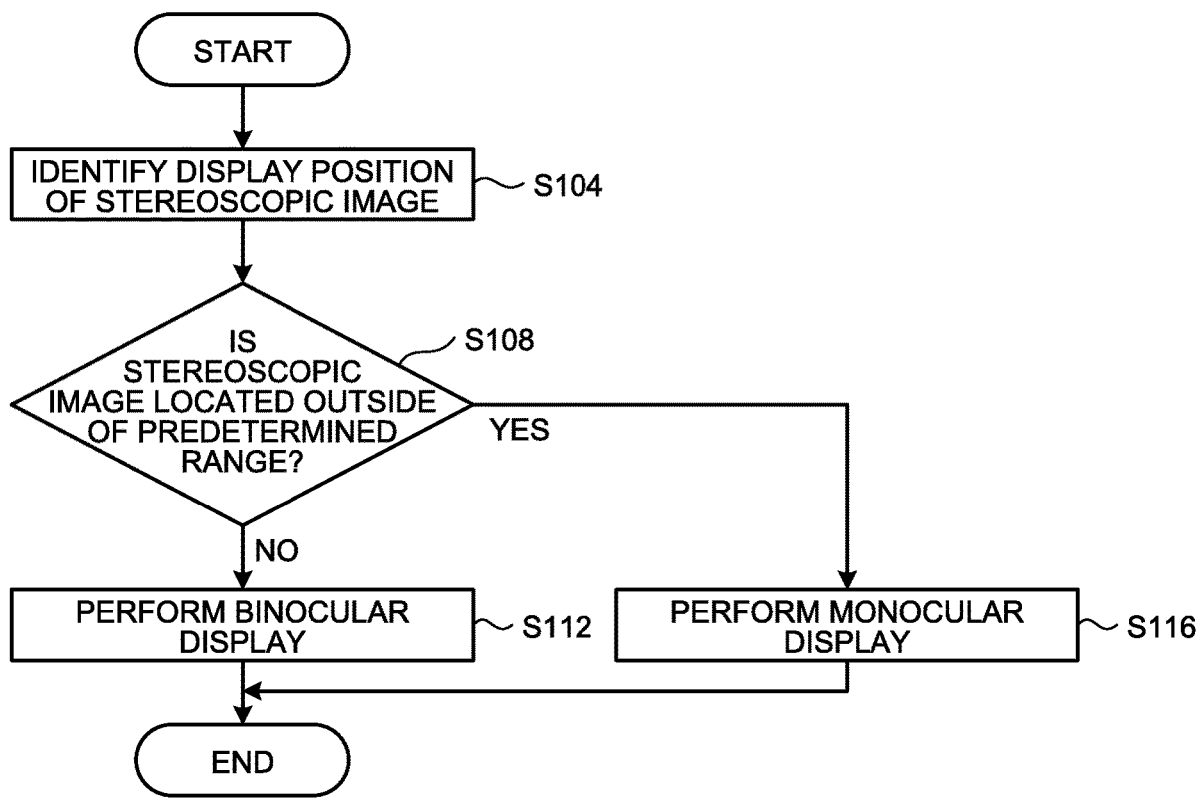
FIG. 5 is a flowchart illustrating an example of operation performed by the information processing apparatus 1-1 according to the first embodiment.

FIG. 5 is a flowchart illustrating an example of the operation performed by the information processing apparatus 1-1 according to the first embodiment. With reference to FIG. 5, first, the display position of the stereoscopic image is identified (S104). Identification of the display position of the stereoscopic image at Step S104 may be performed by, for example, the display control unit 123 or a certain function (not illustrated) of the control unit 12-1.

Subsequently, the determination unit 121 determines whether the stereoscopic image is located outside of the predetermined range (S108). If the determination unit 121 determines that the stereoscopic image is located outside of the predetermined range (Yes at S108), the display control unit 123 causes the display unit 15 to display the stereoscopic image using the binocular display (S112).

In contrast, if the determination unit 121 determines that the stereoscopic image is located outside of the predetermined range (No at S108), the display control unit 123 causes the display unit 15 to display the stereoscopic image using the monocular display (S116).

Thus, the example of the basic operation of the first embodiment has been escribed. Meanwhile, at Step S116, the display control unit 123 may cause the display unit 15 to display, for example, only one of the left-eye image and the right-eye image corresponding to the dominant eye of the user on the basis of the user information as described above. Alternatively, the display control unit 123 may cause the display unit 15 to display only one of the left-eye image and the right-eye image determined in advance.

Further, the display control unit 123 may also be possible to determine the one image that is to be displayed by the display unit 15, on the basis of the display position of the stereoscopic image as described above. Here, with reference to FIG. 6, an example of the operation of determining one image to be displayed by the display unit 15 on the basis of the display position of the stereoscopic image will be described.

Figure 6:
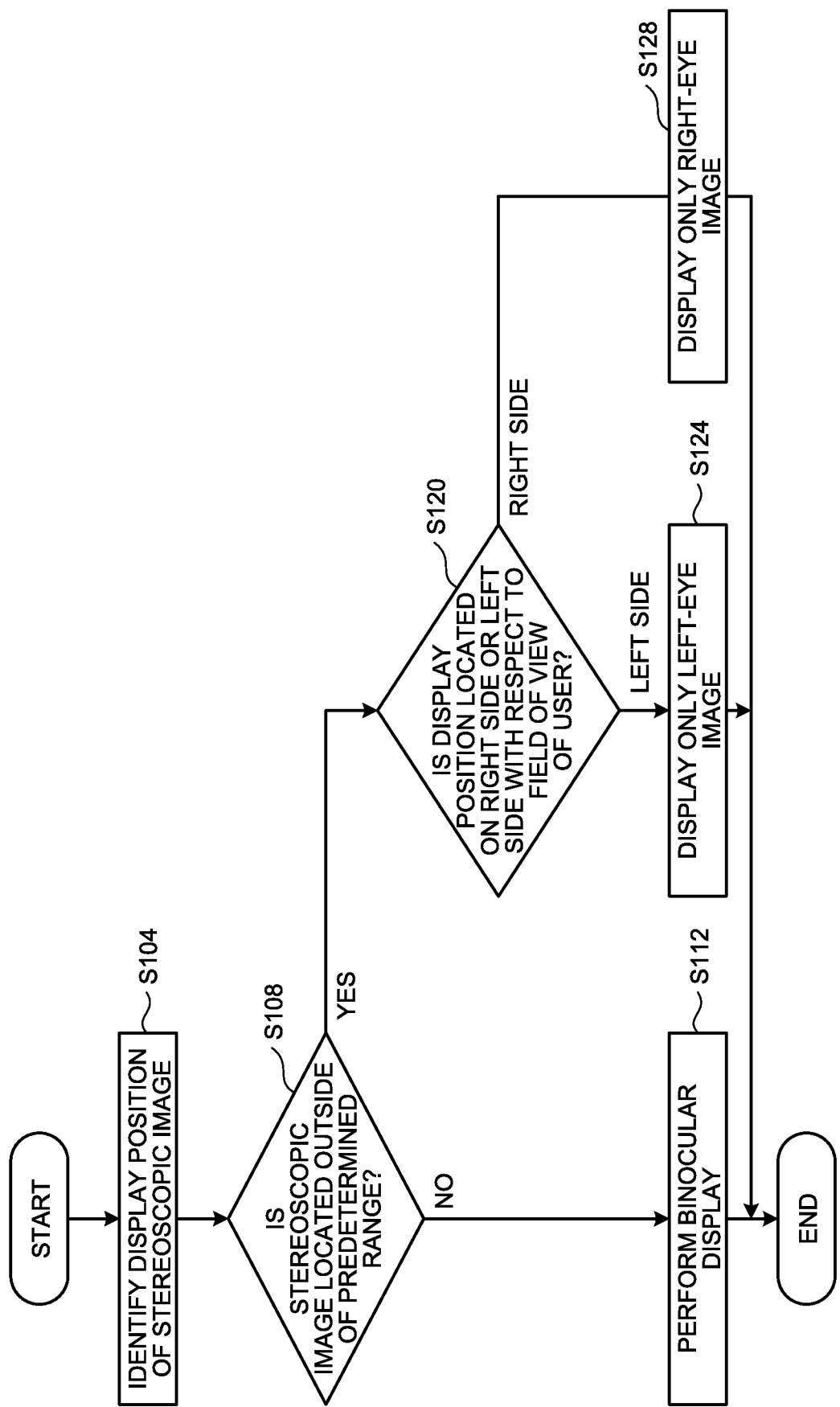
FIG. 6 is a flowchart illustrating another example of the operation performed by the information processing apparatus 1-1 according to the first embodiment.

FIG. 6 is a flowchart illustrating another example of the operation performed by the information processing apparatus 1-1 according to the first embodiment. Steps S104 to S112 in FIG. 6 are the same as Steps S104 to S112 in FIG. 5, and therefore, explanation of Steps S104 to S112 will be omitted.

At Step S108, if it is determined that the stereoscopic image is located outside of the predetermined range, the display control unit 123 determines, at Step S120, one image that is to be displayed by the display unit 15, in accordance the display position of the stereoscopic image with respect to the field of view of the user.

If the display position of the stereoscopic image is located on the left side with respect to the central direction of the field of view of the user, the display control unit 123 causes the display unit 15 to display only the left-eye image (S124). In contrast, if the display position of the stereoscopic image is located on the right side with respect to the central direction of the field of view of the user, the display control unit 123 causes the display unit 15 to display only the right-eye image (S128).

3. SECOND EMBODIMENT

Thus, the first embodiment of the present disclosure has been described above. Next, a second embodiment of the present disclosure will be described. In the second embodiment of the present disclosure described below, whether a stereoscopic image is located outside of the predetermined range is determined when a trigger is detected based on sensing. For example, a predetermined user's motion may be detected as a trigger.

According to the second embodiment, for example, it becomes possible to appropriately change a display format related to a stereoscopic image of a User Interface (UI), such as a clock or a menu, that is displayed in accordance with a trigger. When the UI as described above is to be displayed, it may be important that a user is able to view information more accurately (visibility) or a user is able to perform operation comfortably (operability), rather than enjoying impact, realism, or the like. Therefore, according to the second embodiment, when the stereoscopic image for which importance is given to the visibility or the operability, it is possible to improve the visibility or the operability while reducing a burden on a user. A configuration and operation of the second embodiment for achieving the above-described effects will be sequentially described in detail below.

3-1. Configuration

First, a configuration of an information processing apparatus 1 according to the second embodiment of the present disclosure will be described in detail. In the following, the information processing apparatus 1 according to the second embodiment of the present disclosure will be referred to as an information processing apparatus 1-2.

Figure 7:
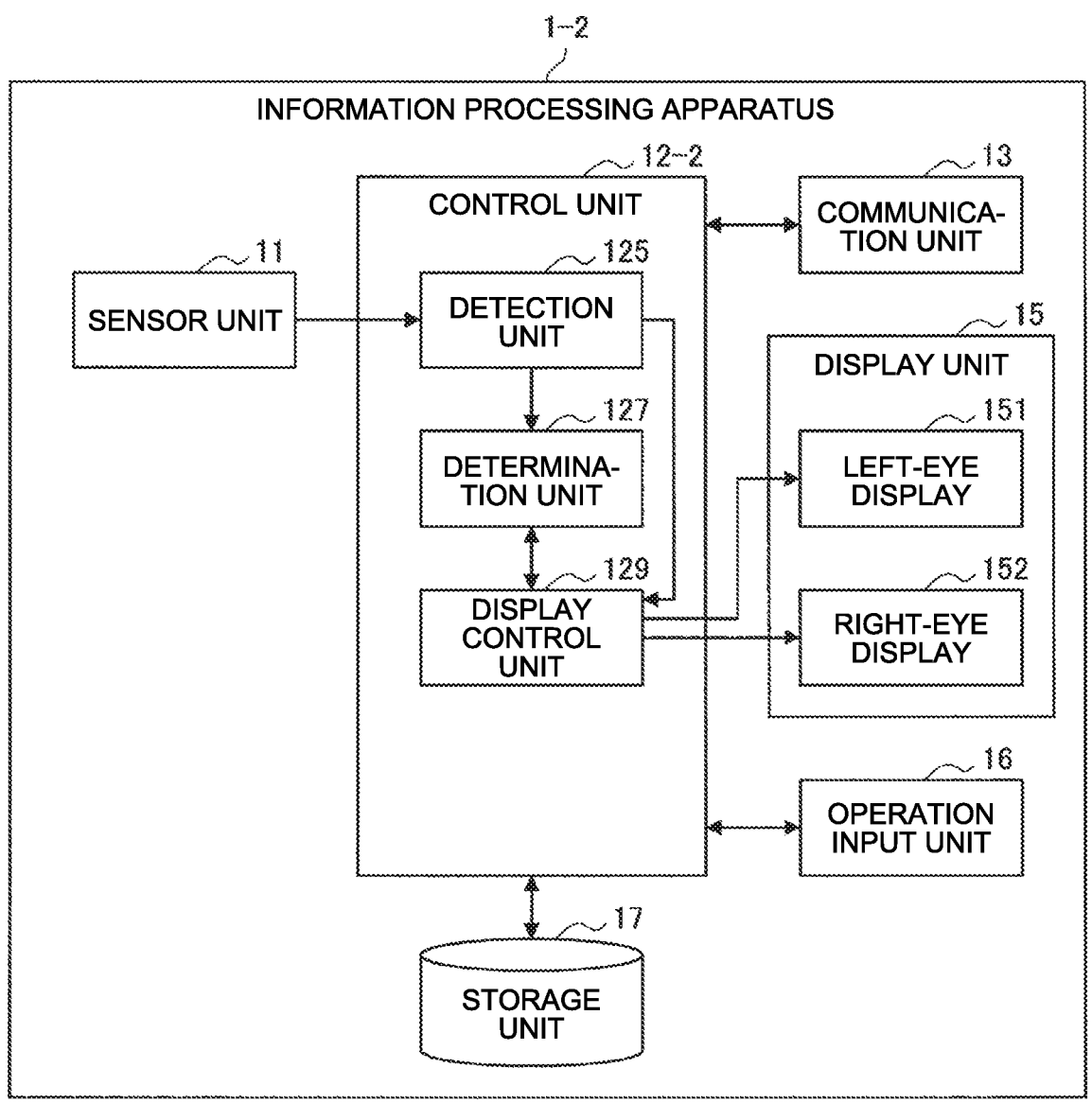
FIG. 7 is a block diagram illustrating a configuration of an information processing apparatus 1-2 according to a second embodiment of the present disclosure.

FIG. 7 is a block diagram illustrating a configuration of the information processing apparatus 1-2 according to the second embodiment of the present disclosure. As illustrated in FIG. 7, the information processing apparatus 1-2 according to the second embodiment includes a sensor unit 11, a control unit 12-2, the communication unit 13, the display unit 15, the operation input unit 16, and the storage unit 17. Meanwhile, in the configuration illustrated in FIG. 7, configurations of the communication unit 13, the display unit 15, the operation input unit 16, and the storage unit 17 are substantially the same as the configurations of the communication unit 13, the display unit 15, the operation input unit 16, and the storage unit 17 that are described above with reference to FIG. 4, and therefore, detailed explanation of these units will be omitted.

The sensor unit 11 acquires, by sensing, sensor information on a user who wears the information processing apparatus 1-2 and surrounding environments. The sensor unit 11 may include a sensor, such as a camera that captures an image of a field of view of the user, a depth sensor that measures a distance, an acceleration sensor that detects acceleration, or a gyro sensor that detects an angular velocity. Meanwhile, the sensor included in the sensor unit 11 is not limited to the example as described above, and the sensor unit 11 may further include a line-of-sight sensor, a geomagnetic sensor, a force sensor, a biological sensor, a microphone, or the like.

The control unit 12-2 functions as an arithmetic processing device and a control device and controls the entire operation in the information processing apparatus 1-2 in accordance with various programs. Further, the control unit 12-2 according to the second embodiment functions, as illustrated in FIG. 4, a detection unit 125, a determination unit 127, and a display control unit 129.

The detection unit 125 performs detection based on sensor data that is acquired through sensing performed by the the sensor unit 11. The detection unit 125 provides information obtained by detection to the determination unit 127 and the display control unit 129.

The detection unit 125 detects, for example, a real object that is present in a real space, on the basis of sensor data that is acquired through sensing performed by the camera or the depth sensor included in the sensor unit 11. For example, the detection unit 125 may detect a hand, an arm, or the like of the user on the basis of an image obtained by capturing performed by the camera or distance information obtained by the depth sensor. Meanwhile, the real object detected by the detection unit 125 is not limited to the above-described example, and may depend on, for example, an application or the like provided by the information processing apparatus 1-2. More specifically, an object that is determined for each of applications, that is located at a close range from the user, and that has substantially a flat surface may be adopted. This is because, in general, accuracy of positioning of a virtual image on a flat surface is higher than accuracy of positioning on a non-flat surface. Further, the detection unit 125 may identify information on a position of the detected real object, an angle of the real object, and a distance to the real object on the basis of the image obtained by capturing performed by the camera or the distance information acquired by the depth sensor.

Further, the detection unit 125 may detect user's motion on the basis of sensor data that is acquired through sensing performed by the camera, the depth sensor, the acceleration sensor, the gyro sensor or the like included in the sensor unit 11.

For example, the detection unit 125 is able to detect user's motion in which the user faces downward, or user's motion of moving an arm or a hand to the inside of the field of view. For example, it is possible to detect user's motion of looking at a watch as described below. In this user's motion, it is assumed that the user faces slightly downward and motion of the arm is motion of exposing a wrist while crossing the user's line of sight. The detection unit 125 is able to detect motion in which the user faces downward, on the basis of sensing performed by the acceleration sensor and the gyro sensor, for example. Then, the detection unit 125 detects the motion of exposing the wrist while crossing the user's line of sight on the basis of the image obtained by capturing performed by the camera. Meanwhile, the detection unit 125 at this time may identify information on a position of the arm (one example of the real object), an angle of the arm, and a distance to the arm on the basis of the image obtained by capturing performed by the camera or the distance information acquired by the depth sensor as described above.

Further, the detection unit 125 according to the second embodiment detects a trigger used by the determination unit 127 and the display control unit 129 as will be described later. Meanwhile, if the detection unit 125 detects the trigger, the determination unit 127 and the display control unit 129 perform predetermined processes as will be described later.

The detection unit 125 may detect, as the trigger, predetermined user's action, for example. For example, the detection unit 125 may detect, as the trigger, user's action of facing downward or user's action of looking at a watch as described above. However, the motion as described above is one example, and the predetermined motion to be detected as the trigger may depend on, for example, an application or the like provided by the information processing apparatus 1-2.

Meanwhile, the trigger detected by the detection unit 125 is not limited to user's action. The detection unit 125 may detect a predetermined type of a real object as the trigger. This example will be described later as modifications.

Upon detecting the trigger, the detection unit 125 notifies the determination unit 127 and the display control unit 129 that the trigger has been detected.

The determination unit 127 determines whether the stereoscopic image is located outside of the predetermined range, similarly to the determination unit 121 described in the first embodiment. A determination method adopted by the determination unit 127 and the predetermined range used for the determination are the same as the determination method adopted by the determination unit 121 and the predetermined range used by the determination as described above. However, the determination unit 127 according to the second embodiment is different from the above-described determination unit 121 in that the determination unit 127 determines whether the stereoscopic image is located outside of the predetermined range if the detection unit 125 detects the trigger. This will be mainly described below.

If the detection unit 125 detects the trigger, the determination unit 127 determines whether a stereoscopic image, which is to be displayed by the display control unit 129 (to be described later) in accordance with detection of the trigger, is located outside of the predetermined range. For example, a use case will be described in which the display control unit 129 (to be described later) provides an application that superimposes a stereoscopic image of a watch (one example of the UI) on an arm of the user in accordance with user's action (one example of the detected trigger) of looking at the watch. In this use case, if the user's action of looking at the watch is detected as the trigger, the determination unit 127 determines whether the stereoscopic image of the watch to be displayed by the display control unit 129 is located outside of the predetermined range.

As described above, when the UI, such as a watch or an operation menu, is to be displayed, importance may be given to the visibility or the operability, rather than enjoyment of impact, reality, or the like. According to the second embodiment, for example, it is possible to change the display format of an image to the monocular display only when a stereoscopic image for which importance is given to the visibility or the operability. However, a type of the stereoscopic image for which the display format is to be changed to the monocular display depends on display of the stereoscopic image and a type of the trigger for determination performed by the determination unit 127.

The display control unit 129 causes the display unit 15 to display the stereoscopic image in the real space, similarly to the display control unit 123 described in the first embodiment. Further, the display control unit 129 controls the display unit 15 on the basis of the determination performed by the determination unit 127 as described above. A method of controlling the display unit 15 by the display control unit 129 on the basis of the determination is the same as the method of controlling the display unit 15 performed by the display control unit 123 on the basis of the determination. However, the display control unit 129 according to the second embodiment is different from the above-described display control unit 129 in that the display control unit 129 displays the stereoscopic image in accordance with the trigger detected by the detection unit 125. This will be mainly described below.

If, for example, the detection unit 125 detects a trigger, the display control unit 129 displays a stereoscopic image corresponding to the trigger. For example, if the detection unit 125 detects a plurality of kinds of triggers, the display control unit 129 may display different stereoscopic images in accordance with the types of the triggers.

Further, the display control unit 129 may display a stereoscopic image on the basis of information on a real object detected by the detection unit 125. For example, the display control unit 129 may display the stereoscopic image at a position in the real space corresponding to a position of the real object detected by the detection unit 125, in accordance with an angle of the real object.

Furthermore, if the detection unit 125 detects predetermined user's motion as the trigger, the display control unit 129 may display a stereoscopic image corresponding to the user's motion, on the basis of a real object that is detected together with the user's motion. For example, the display control unit 129 may display, in accordance with user's motion (one example of the trigger) of looking at a watch detected by the detection unit 125, a stereoscopic image of the watch such that the stereoscopic image is superimposed on an arm or a hand of the user.

Meanwhile, the stereoscopic image that is displayed in accordance with the trigger detected by the detection unit 125 is a target for determination performed by the determination unit 127. Therefore, the stereoscopic image that is displayed in accordance with the trigger detected by the detection unit 125 may be, for example, an image for which importance is given to the visibility or the operability rather than enjoyment of impact, reality, or the like, and may be a UI, such as a clock or an operation menu, as described above. The stereoscopic image as described above has little disadvantages of reduction of impact or reality even if the image is displayed using the monocular display instead of the binocular display as a result of the determination performed by the determination unit 127. In contrast, the visibility or the operability is important for the stereoscopic image as described above, and therefore, if the stereoscopic image is located outside of the predetermined range, it is possible to improve the visibility or the operability while reducing a burden on the user by displaying the stereoscopic image using the monocular display.

Further, the display control unit 129 according to the second embodiment may display a stereoscopic image that is independent of the trigger detected by the detection unit 125. In this case, this stereoscopic image is not the target for the determination performed by the determination unit 127 as described above. Therefore, the stereoscopic image that is displayed independently of the trigger detected by the detection unit 125 may be, for example, an image for which importance is given to enjoyment of impact, reality, or the like rather than the visibility or the operability. With this configuration, the stereoscopic image for which importance is given to the impact, the reality, or the like is displayed using the binocular display instead of the monocular display, so that the impact or the reality given to the user is less likely to be damaged.

Thus, the configuration of the information processing apparatus 1-1 according to the present embodiment has been described above. Meanwhile, the configuration of the information processing apparatus 1-1 illustrated in FIG. 4 is one example, and embodiments are not limited to this example. For example, each of the functions of the control unit 12-1 according to the present embodiment may be implemented by a different information processing apparatus connected via the communication unit 13, instead of the control unit 12-1.

3-2. Operation

Figure 8:
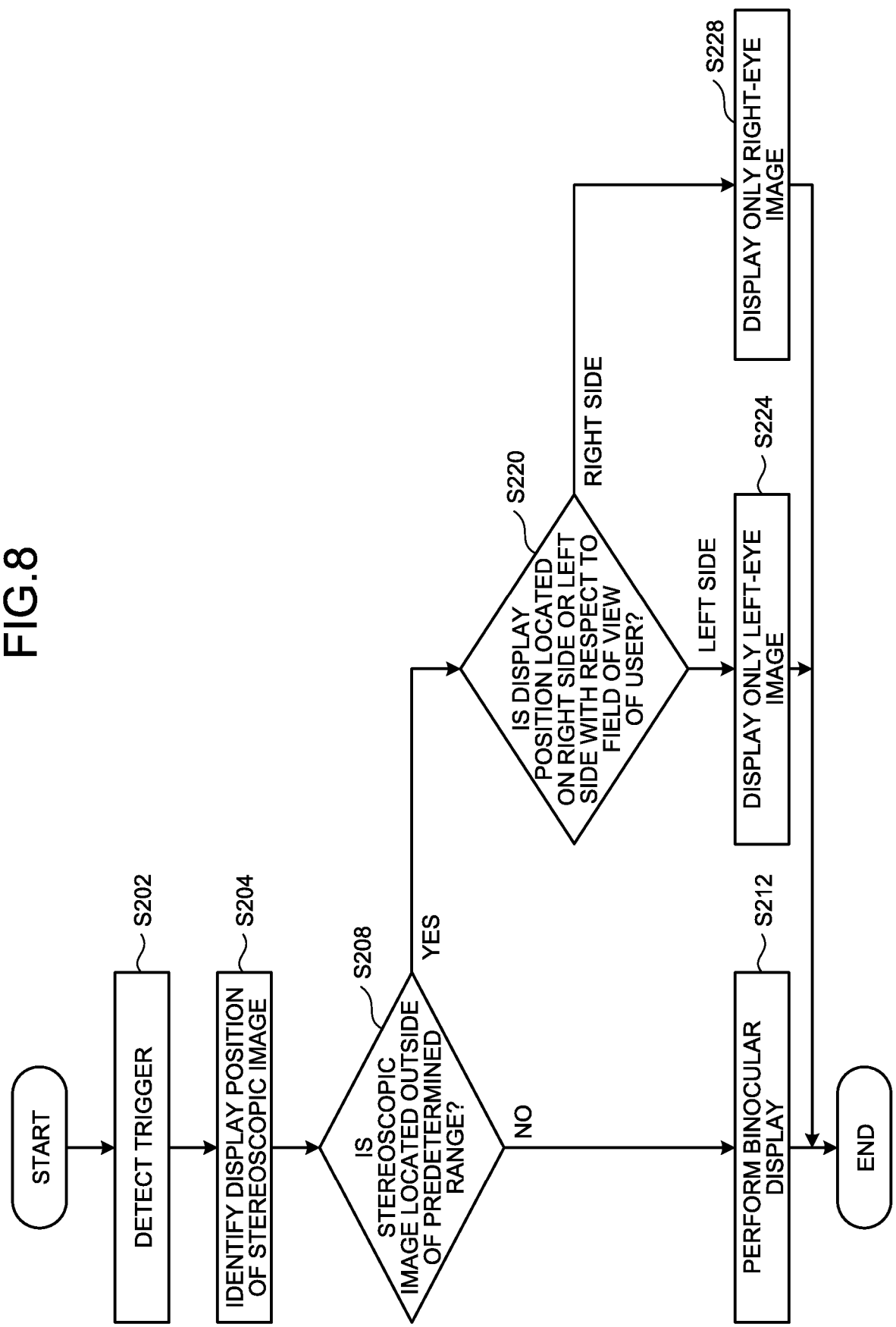
FIG. 8 is a flowchart illustrating an example of operation performed by the information processing apparatus 1-2 according to the second embodiment.

Thus, the configuration example of the information processing apparatus 1-2 according to the second embodiment of the present disclosure has been described above. Next, with reference to FIG. 8, an example of operation performed by the information processing apparatus 1-2 according to the second embodiment will be described. FIG. 8 is a flowchart illustrating an example of the operation performed by the information processing apparatus 1-2 according to the second embodiment.

With reference to FIG. 8, the detection unit 125 detects a trigger on the basis of sensing performed by the the sensor unit 11 (S202). At Step S202, the detection unit 125 may detect a real object present in a real space together with detecting predetermined user's motion as the trigger.

Subsequently, at Step S204, a display position of a stereoscopic image that is to be displayed in accordance with the detected trigger is identified (S204). Identification of the display position of the stereoscopic image at Step S204 may be performed by the display control unit 123, or the display position of the stereoscopic image may be identified on the basis of a position of the real object detected at Step S202, for example.

Subsequently, the determination unit 127 determines whether the stereoscopic image for which the display position is identified at Step S204 is located outside of the predetermined range (S208). If the determination unit 127 determines that the stereoscopic image is located outside of the predetermined range (Yes at S208), the display control unit 129 causes the display unit 15 to display the stereoscopic image using the binocular display (S212).

In contrast, if the determination unit 127 determines that the stereoscopic image is located outside of the predetermined range (No at S208), the display control unit 129 determines, at Step S220, one image that is to be displayed by the display unit 15, in accordance with the display position of the stereoscopic image with respect to the field of view of the user.

If the display position of the stereoscopic image is located on the left side with respect to the central direction of the field of view of the user, the display control unit 129 causes the display unit 15 to display only the left-eye image (S224). In contrast, if the display position of the stereoscopic image is located on the right side with respect to the central direction of the field of view of the user, the display control unit 129 causes the display unit 15 to display only the right-eye image (S228).

Meanwhile, while the example has been described above in which the display control unit 129 according to the second embodiment determines one image that is to be displayed by the display unit 15, on the basis of the display position of the stereoscopic image, but embodiments are not limited to this example. The display control unit 129 according to the second embodiment may determine the one image that is to be displayed by the display unit 15, on the basis of the user information or may cause the display unit 15 to display only one image that is determined in advance, similarly to the first embodiment.

4. MODIFICATIONS

Thus, the first embodiment and the second embodiment of the present disclosure have been described above. In the following, some modifications of each of the embodiments as described above will be described. Meanwhile, each of the modifications as described below may be applied independently to each of the embodiments, or may be applied to each of the embodiments in a combined manner. Further, each of the modifications may be applied in place of the configurations described in each of the embodiments or may be additionally applied to the configurations described in each of the embodiments.

4-1. First Modification

In the second embodiment as described above, the example has been described in which the user's action is detected as the trigger. However, the present technology is not limited to this example. For example, the detection unit 125 may detect a predetermined type of a real object as the trigger.

For example, as described above, if a stereoscopic image is displayed by using a hand of the user as the display position, the convergence distance that is a distance from the user to the display position of the stereoscopic image is expected to fall in a range from about 30 cm to 70 cm. Then, if the stereoscopic image is displayed by using the hand of the user as the display position as described above, it seems likely that a burden, such as an uncomfortable feeling or a discomfort feeling, is imposed on the user.

Therefore, for example, if the display control unit 129 displays the stereoscopic image by using the hand or the arm of the user as the display position, the detection unit 125 may detect the hand or the arm (one example of the real object) of the user who is wearing the information processing apparatus 1-2 as a trigger. With this configuration, the determination unit 127 performs determination when a stereoscopic image that is likely to impose a burden, such as an uncomfortable feeling or a discomfort feeling, on the user, so that it is possible to more effectively perform the determination.

Furthermore, depending on the adjustment distance of the display unit 15, a stereoscopic image that is displayed at a close range, such as on the hand or the arm of the user, may be likely to impose a burden, such as an uncomfortable feeling or a discomfort feeling, on the user in an entire movable range of the hand or the arm of the user.

Therefore, the determination unit 127 may determine whether the stereoscopic image is located outside of the predetermined range by using information on the detected trigger. As described above, a type and a position of the stereoscopic image can be identified to some extent, in accordance with the detected trigger. Therefore, the determination unit 127 may determine whether the stereoscopic image is located outside of the predetermined range on the basis of the detected trigger.

If a user's action is detected as the trigger, the determination unit 127 may serve as a first determination unit and detect whether the stereoscopic image is located outside of the predetermined range on the basis of the user's action. For example, a case will be described in which, as described above, a user's action of looking at a watch is detected as the trigger, and a stereoscopic image of the watch is superimposed on the arm of the user will be described. In this use case, depending on the adjustment distance of the display unit 15, the stereoscopic image may be located outside of the predetermined range in the entire movable range of the user. In this case, the determination unit 127 may determine that the stereoscopic image is located outside of the predetermined range or located at a closer range than the predetermined range, on the basis of the fact that the action of looking at the watch is detected as the trigger.

Further, if a real object is detected as the trigger, the determination unit 127 may serve as a second determination unit and determine whether the stereoscopic image is located outside of the predetermined range on the basis of the real object. For example, as described above, the use case will be described in which the stereoscopic image is displayed on the hand or the arm of the user. In this use case, depending on the adjustment distance of the display unit 15, the stereoscopic image may be located outside of the predetermined range in the entire movable range of the hand or the arm. In this case, the determination unit 127 may determine that the stereoscopic image is located outside of the predetermined range on the basis of the fact that the hand or the arm of the user is detected as the trigger. Meanwhile, a virtual image that is displayed using only the monocular display is regarded as a non-stereoscopic image.

With this configuration, the processes performed by the determination unit 127 are simplified, an amount of the processes is reduced, and a time taken to the determination is reduced, so that it becomes possible to perform display more smoothly.

4-2. Second Modification

In the embodiments as described above, the case has been described in which the information processing apparatus 1 includes the display unit with optical transmissivity, but the present technology is not limited to this example. In the following, some examples of other apparatuses to which the present technology may be adopted will be described.

For example, the present technology may be adopted to an HMD that includes a display unit without optical transmissivity. In this case, for example, the present technology may be adopted to an HMD of what is called a video see-through type, in which an image of a real space is acquired by using an imaging device and an image that is obtained by superimposing a stereoscopic image on the acquired image of the real space is displayed. Alternatively, the present technology may be adopted to an HMD that displays a stereoscopic image in a virtual space (one example of the three-dimensional space), instead of the real space.

Furthermore, the present technology may be adopted to display control performed by an installation-type display device, instead of an HMD. For example, in the installation-type display device that displays a stereoscopic image, it is possible to detect a position of a user by using a sensor or the like, determine whether the stereoscopic image is located outside of the predetermined range on the basis of the position of the user and a position of the display device, and perform the above-described display control based on the determination. Meanwhile, in this case, the above-described adjustment distance may correspond to a distance between the position of the user (more precisely, the positions of the eyeballs of the user) and the position of the display device, and the above-described convergence distance may correspond to the position of the user (more precisely, the positions of the eyeballs of the user) and the display position of the stereoscopic image. It may be possible to set the predetermined range based on the adjustment distance and the convergence distance as described above, and determine whether the stereoscopic image is located outside of the predetermined range.

4-3. Third Modification

In FIG. 3, the example has been described in which the monocular display is adopted as the display format of an image if the convergence distance is smaller than the first distance D1, but the present technology is not limited to this example. For example, when a stereoscopic image is displayed at a position too close to the user, even if the monocular display is adopted as the display format of the image, a burden may be imposed on the user. Therefore, for example, if the convergence distance is smaller than a third distance that is smaller than the first distance D1, it may be possible to perform display control so as not to display the stereoscopic image.

5. HARDWARE CONFIGURATION EXAMPLE

Figure 9:
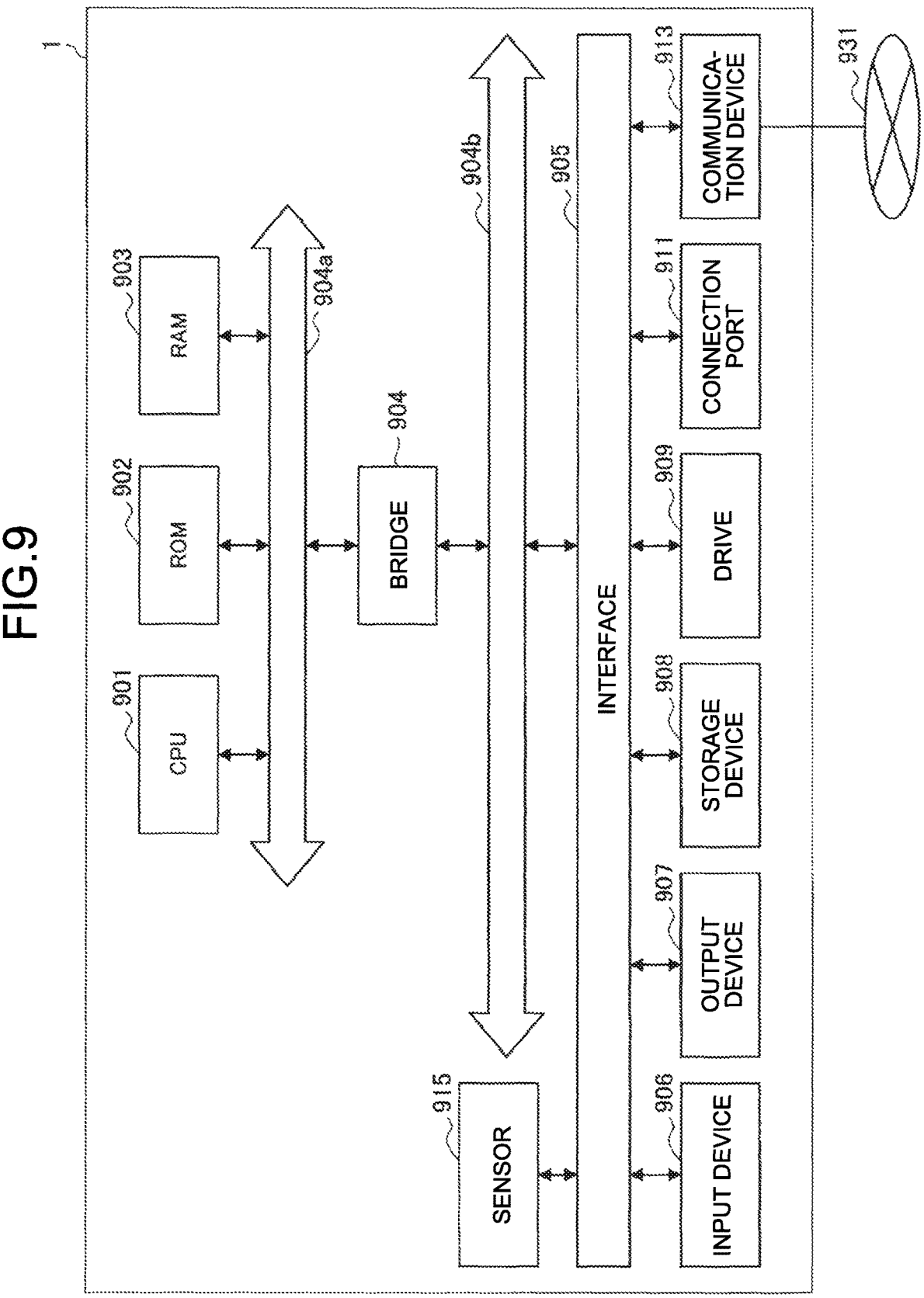
FIG. 9 is an explanatory diagram illustrating a hardware configuration example.

Thus, the embodiments of the present disclosure have been described above. Lastly, with reference to FIG. 9, a hardware configuration of the information processing apparatus according to the embodiments of the present disclosure will be described. FIG. 9 is a block diagram illustrating a hardware configuration example of the information processing apparatus 1 according to the embodiments of the present disclosure. Meanwhile, the information processing apparatus 1 illustrated in FIG. 9 can realize, for example, the information processing apparatus 1-1 and the information processing apparatus 1-2 illustrated in FIG. 4 and FIG. 7. Information processing performed by the information processing apparatus 1-1 and the information processing apparatus 1-2 according to the embodiments of the present disclosure are realized by cooperation of software and hardware as described below.

As illustrated in FIG. 9, the information processing apparatus 1 includes a central processing unit (CPU) 901, a read only memory (ROM) 902, a random access memory (RAM) 903, and a host bus 904a. Further, the information processing apparatus 1 includes a bridge 904, an external bus 904b, an interface 905, an input device 906, an output device 907, a storage device 908, a drive 909, a connection port 911, a communication device 913, and a sensor 915. The information processing apparatus 1 may include a processing circuit, such as a DSP or an ASIC, in place of or together with the CPU 901.

The CPU 901 functions as an arithmetic processing device and a control device, and controls entire operation in the information processing apparatus 1 in accordance with various programs. Further, the CPU 901 may be a microprocessor. The ROM 902 stores therein a program, a calculation parameter, and the like used by the CPU 901. The RAM 903 temporarily stores therein a program used in operation performed by the CPU 901, a parameter that is appropriately changed in the operation, and the like. The CPU 901 may constitute, for example, the control unit 12-1 and the control unit 12-2.

The CPU 901, the ROM 902, and the RAM 903 are connected to one another via the host bus 904a including a CPU bus or the like. The host bus 904a is connected to the external bus 904b, such as a Peripheral Component Interconnect/Interface (PCI), via the bridge 904. Meanwhile, the host bus 904a, the bridge 904, and the external bus 904b need not always be constructed separately, but functions of these buses may be implemented in a single bus.

The input device 906 is realized by a device, such as a mouse, a keyboard, a touch panel, a button, a microphone, a switch, or a lever, by which information is input by a user. Further, the input device 906 may be, for example, a remote control device using infrared or other radio waves, or an externally connected device, such as a mobile phone or a PDA, which is compatible with operation of the information processing apparatus 1. Furthermore, the input device 906 may include, for example, an input control circuit that generates an input signal based on information that is input by the user using the above-described input means, and outputs the input signal to the CPU 901. The user of the information processing apparatus 1 is able to input various kinds of data and gives an instruction on processing operation to the information processing apparatus 1 by operating the input device 906.

The output device 907 is constructed by a device that is able to visually or aurally notify the user of the acquired information. Examples of this kind of device include a display device, such as a CRT display device, a liquid crystal display device, a plasma display device, an EL display device, and a lamp, a voice output device, such as a speaker and a headphone, and a printer device. The output device 907 outputs, for example, a result that is obtained through various processes performed by the information processing apparatus 1.

Specifically, the display device visually displays the result that is obtained through various processes performed by the information processing apparatus 1, in various formats, such as a text, an image, a table, or a graph. In contrast, the voice output device converts an audio signal formed of reproduced voice data, reproduced acoustic data, or the like into an analog signal, and aurally outputs the analog signal. The output device 907 may construct, for example, the display unit 15.

The storage device 908 is a data storage device that is constructed as one example of the storage unit of the information processing apparatus 1. The storage device 908 is realized by, for example, a magnetic storage device, such as an HDD, a semiconductor storage device, an optical storage device, a magneto optical storage device, or the like. The storage device 908 may include a storage medium, a recording device for recording data to a storage medium, a reading device for reading data from a storage medium, a deleting device for deleting data recorded in a storage medium, or the like. The storage device 908 stores therein a program and various kinds of data executed by the CPU 901, various kinds of data acquired from outside, and the like. The above-described storage device 908 may construct, for example, the storage unit 17.

The drive 909 is a reader-writer for a storage medium and incorporated in or externally attached to the information processing apparatus 1. The drive 909 reads information recorded in an attached removable storage medium, such as a magnetic disc, an optical disk, a magneto optical disk, or a semiconductor memory, and outputs the information to the RAM 903. Further, the drive 909 is able to write information to a removable storage medium.

The connection port 911 is an interface that is connected to an external apparatus, and serves as a connection port to the external apparatus to which data can be transmitted via a Universal Serial Bus (USB) or the like, for example.

The communication device 913 is, for example, a communication interface constructed by a communication device or the like for connecting to a network 920. The communication device 913 is, for example, a wired or wireless Local Area Network (LAN), a Long Term Evolution (LTE), Bluetooth (registered trademark), a communication card for Wireless USB (WUSB), or the like. Further, the communication device 913 may be a router for optical communication, a router for Asymmetric Digital Subscriber Line (ADSL), a modem for various kinds of communication, or the like. The communication device 913 is able to transmit and receive signals or the like in accordance with a predetermined protocol, such as TCP/IP. The communication device 913 may construct, for example, the communication unit 13.

The sensor 915 is various kinds of sensors, such as an acceleration sensor, a gyro sensor, a geomagnetic sensor, an optical sensor, a sound sensor, a ranging sensor, or a force sensor. The sensor 915 acquires information on a state of the information processing apparatus 1, such as a posture or a moving speed of the information processing apparatus 1, and information on surrounding environments of the information processing apparatus 1, such as brightness or noise around the information processing apparatus 1. Further, the sensor 915 may include a GPS sensor that receives a GPS signal and measures latitude, longitude, and altitude of the apparatus. The sensor 915 may construct, for example, the sensor unit 11.

Meanwhile, the network 920 is a wired or wireless transmission path for information that is transmitted from an apparatus connected to the network 920. For example, the network 920 may include a public line network, such as the Internet, a telephone network, or a satellite communication network, various Local Area Networks (LANs) and Wide Area Networks (WANs) including Ethernet (registered trademark), and the like. Further, the network 920 may include a dedicated line network, such as Internet Protocol-Virtual Private Network (IP-VPN).

Thus, one example of the hardware configuration capable of implementing the functions of the information processing apparatus 1 according to the embodiments of the present disclosure has been described above. Each of the constituent elements as described above may be realized using a general-purpose member, or may be realized by hardware specialized for the functions of each of the constituent elements. Therefore, it is possible to appropriately change a hardware configuration to be used, in accordance with a technology level at the time the embodiments of the present disclosure are embodied.

Meanwhile, it is possible to generate a computer program for implementing each of the functions of the information processing apparatus 1 according to the embodiments of the present disclosure as described above, and install the computer program in a PC or the like. Further, it is possible to provide a computer readable recording medium in which the computer program as described above is stored. Examples of the recording medium include a magnetic disk, an optical disk, a magneto optical disk, and a flash memory. Furthermore, the computer program as described above may be distributed via, for example, a network without using a recording medium.

6. CONCLUSION

As described above, according to the embodiments of the present disclosure, it is possible to reduce a burden on a user in stereoscopic vision.

While the preferred embodiments of the present disclosure have been described in detail above with reference to the accompanying drawings, the technical scope of the present disclosure is not limited to the examples as described above. It is obvious that a person skilled in the technical field of the present disclosure may conceive various alternations and modifications within the scope of the technical idea of the appended claims, and it should be understood that they will naturally come under the technical scope of the present disclosure.

For example, each of Steps in the processes performed in the embodiments as described above need not always be processed in chronological order as illustrated in the flowchart. For example, each of Steps of the processes in the embodiments as described above may be executed in different order from the order illustrated in the flowchart, or may be performed in a parallel manner.

Furthermore, the effects described in this specification are merely illustrative or exemplified effects, and are not limitative. That is, with or in the place of the above effects, the technology according to the present disclosure may achieve other effects that are clear to those skilled in the art from the description of this specification.

The following configurations are also within the technical scope of the present disclosure.

(1)

An information processing apparatus comprising:

a display control unit that causes a display unit to display a virtual image in a three-dimensional space, wherein the display control unit causes the display unit to display only one of a left-eye image and a right-eye image corresponding to the virtual image if it is determined that the virtual image is located outside of a predetermined range in a depth direction when viewed from a user of the display unit, and causes the display unit to display the left-eye image and the right-eye image if it is determined that the virtual image is located inside of the predetermined range.

(2)

The information processing apparatus according to (1), wherein the predetermined range is a range separated by a predetermined distance or longer from the user.

(3)

The information processing apparatus according to (2), wherein the display control unit causes the display unit to display a stereoscopic image in the predetermined range.

(4)

The information processing apparatus according to any one of (1) to (3), wherein the display control unit causes the display unit to display only one of the left-eye image and the right-eye image if it is determined that the virtual image is located at a closer range than the predetermined range.

(5)

The information processing apparatus according to (4), further comprising:

a first determination unit that determines that the virtual image is located at a closer range than the predetermined range on the basis of detection of a predetermined user's action.

(6)

The information processing apparatus according to (5), wherein the display control unit causes the display unit to display only one of the left-eye image and the right-eye image if it is determined that the virtual image is located at a closer range than the predetermined range on the basis of detection of the predetermined user's action.

(7)

The information processing apparatus according to (6), wherein the display unit is a display unit of a head-mounted display, and the predetermined user's action includes an action in which the user faces downward.

(8)

The information processing apparatus according to any one of (5) to (7), wherein the predetermined user's action includes an action in which the user moves one of an arm and a hand to inside of a field of view.

(9)

The information processing apparatus according to (8), wherein when the predetermined user's action is detected, the display control unit causes the display unit to display only one of the left-eye image and the right-eye image on one of the arm and the hand of the user.

(10)

The information processing apparatus according to (4), further comprising:

a second determination unit that determines that the virtual image is located at a closer range than the predetermined range on the basis of detection of a predetermined real object.

(11)

The information processing apparatus according to any one of (1) to (10), wherein the display unit has a substantially fixed virtual image distance.

(12)

The information processing apparatus according to (11), wherein the predetermined range is a range based on at least one of a first distance that is smaller than the virtual image distance and a second distance that is larger than the virtual image distance.

(13)

The information processing apparatus according to (12), wherein the first distance and the second distance are set such that a difference between a convergence angle corresponding to the virtual image distance and a convergence angle between the left-eye image and the right-eye image becomes equal to or smaller than 1 degree and equal to or larger than −1 degree.

(14)

The information processing apparatus according to any one of (11) to (13), wherein the display unit has optical transmissivity.

(15)

The information processing apparatus according to any one of (11) to (14), wherein the three-dimensional space is a real space.

(16)

The information processing apparatus according to any one of (1) to (15), wherein the display control unit determines the one image that is to be displayed by the display unit, on the basis of user information including information on a dominant eye that is set in advance.

(17)

The information processing apparatus according to any one of (1) to (16), wherein if it is determined that the virtual image is located outside of the predetermined range, the display control unit causes the display unit to display, instead of one of the left-eye image and the right-eye image that is not displayed by the display unit, an alternative image having a smaller amount of information than an amount of information in the one image.

(18)

The information processing apparatus according to any one of (1) to (17), wherein the display unit includes a left-eye display that displays the left-eye image, and a right-eye display that displays the right-eye image, and if it is determined that the virtual image is located outside of the predetermined range, the display control unit reduces power supply to one of the left-eye display and the right-eye display.

(19)

An information processing method comprising:

causing, by a processor, a display unit to display a virtual image in a three-dimensional space;

causing the display unit to display only one of a left-eye image and a right-eye image corresponding to the virtual image if it is determined that the virtual image is located outside of a predetermined range in a depth direction when viewed from a user of the display unit; and causing the display unit to display the left-eye image and the right-eye image if it is determined that the virtual image is located inside of the predetermined range.

(20)

A program that causes a computer to execute functions of:

causing a display unit to display a virtual image in a three-dimensional space;

causing the display unit to display only one of a left-eye image and a right-eye image corresponding to the virtual image if it is determined that the virtual image is located outside of a predetermined range in a depth direction when viewed from a user of the display unit; and causing the display unit to display the left-eye image and the right-eye image if it is determined that the virtual image is located inside of the predetermined range.

REFERENCE SIGNS LIST 1 information processing apparatus
11 sensor unit
12-1, 12-2 control unit
13 communication unit
15 display unit
16 operation input unit
17 storage unit
121, 127 determination unit
123, 129 display control unit
125 detection unit
151 left-eye display
152 right-eye display

The invention claimed is:

1. An information processing apparatus, comprising:
a display control unit configured to control a display unit to display a virtual image in a three-dimensional space, wherein the display unit is associated with a head-mounted display; and
a first determination unit configured to determine, based on detection of a user action, that the virtual image is located outside of a first range and at a second range closer than the first range, wherein
the first range and the second range are in a depth direction when viewed from a user of the display unit,
the user action includes an action in which the user faces downward, and
the display control unit is further configured to:
control the display unit to display one of a left-eye image corresponding to the virtual image or a right-eye image corresponding to the virtual image, based on a determination that the virtual image is located outside of the first range and at the second range closer than the first range, and
control the display unit to display the left-eye image and the right-eye image based on a determination that the virtual image is located inside of the first range.

2. The information processing apparatus according to claim 1, wherein the first range is a range separated by a distance equal to or more than a threshold distance from the user.

3. The information processing apparatus according to claim 2, wherein the display control unit is further configured to control the display unit to display a stereoscopic image in the first range.

4. The information processing apparatus according to claim 1, wherein the user action includes an action in which the user moves one of an arm or a hand to inside of a field of view.

5. The information processing apparatus according to claim 4, wherein the display control unit is further configured to control, based on the detection of the user action, the display unit to display one of the left-eye image or the right-eye image on one of the arm or the hand of the user.

6. The information processing apparatus according to claim 1, further comprising
a second determination unit configured to determine that the virtual image is located at the second, based on detection of a real object.

7. The information processing apparatus according to claim 1, wherein the display unit is associated with a virtual image distance.

8. The information processing apparatus according to claim 7, wherein the first range is based on at least one of a first distance that is smaller than the virtual image distance and a second distance that is larger than the virtual image distance.

9. The information processing apparatus according to claim 8, wherein a difference between a convergence angle corresponding to the virtual image distance and a convergence angle between the left-eye image and the right-eye image is equal to or smaller than 1 degree and equal to or larger than −1 degree.

10. The information processing apparatus according to claim 7, wherein the display unit has optical transmissivity.

11. The information processing apparatus according to claim 1, wherein the three-dimensional space is a real space.

12. The information processing apparatus according to claim 1, wherein
the display control unit is further configured to determine the one of the left-eye image or the right-eye image, based on user information, and
the user information includes information on a dominant eye.

13. The information processing apparatus according to claim 1, wherein
the display control unit is further configured to control the display unit to display an alternative image based on the determination that the virtual image is located outside of the first range, and
an amount of information in the alternative image is smaller than an amount of information in the one of the left-eye image or the right-eye image.

14. The information processing apparatus according to claim 1, wherein
the display unit includes a left-eye display that displays the left-eye image, and a right-eye display that displays the right-eye image, and
the display control unit is further configured to reduce power supply to one of the left-eye display or the right-eye display based on the determination that the virtual image is located outside of the first range.

15. An information processing method, comprising:
controlling, by a processor, a display unit to display a virtual image in a three-dimensional space, wherein the display unit is associated with a head-mounted display;
determining, by the processor, that the virtual image is located outside of a first range and at a second range closer than the first range, wherein the determination is based on detection of a user action,
the first range and the second range are in a depth direction when viewed from a user of the display unit, and
the user action includes an action in which the user faces downward:
controlling, by the processor, the display unit to display one of a left-eye image corresponding to the virtual image or a right-eye image corresponding to the virtual image, based on a determination that the virtual image is located outside of the first range and at the second range closer than the first range; and
controlling, by the processor, the display unit to display the left-eye image and the right-eye image based on a determination that the virtual image is located inside of the first range.

16. A non-transitory computer-readable medium having stored thereon, computer-executable instructions which, when executed by a computer, cause the computer to execute operations, the operations comprising:

controlling a display unit to display a virtual image in a three-dimensional space, wherein the display unit is associated with a head-mounted display;
determining, based on detection of a user action, that the virtual image is located outside of a first range and at a second range closer than the first range, wherein
the first range and the second range are in a depth direction when viewed from a user of the display unit, and
the user action includes an action in which the user faces downward:
controlling the display unit to display one of a left-eye image corresponding to the virtual image or a right-eye image corresponding to the virtual image, based on a determination that the virtual image is located outside of the first range and at the second range closer than the first range; and
controlling the display unit to display the left-eye image and the right-eye image based on a determination that the virtual image is located inside of the first range.

* * * * *